UNITED STATES PATENT OFFICE.

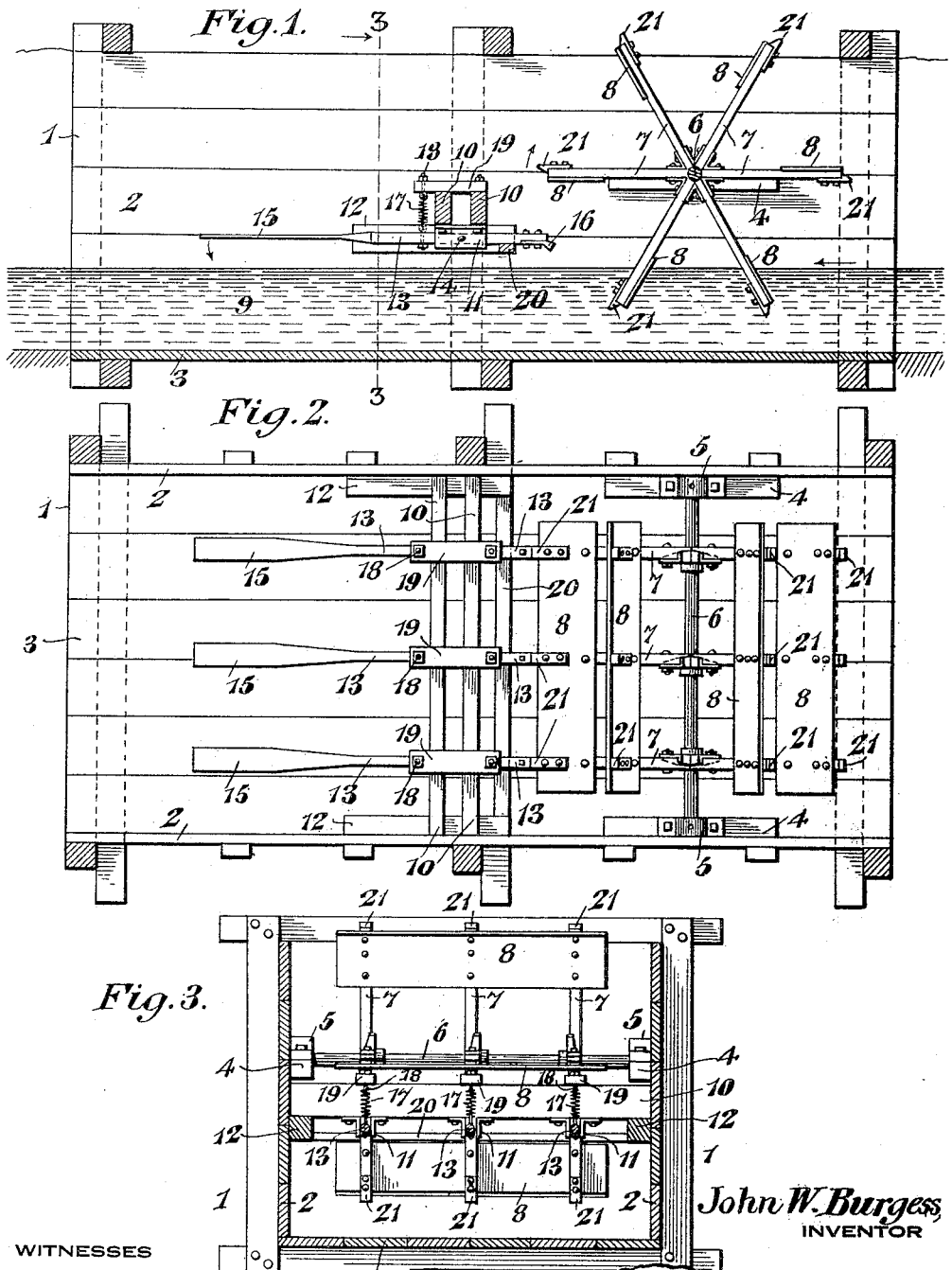

JOHN W. BURGESS, OF SAULT STE. MARIE, MICHIGAN.

FISH-DEFLECTING MEANS FOR THE OUTLETS OF IRRIGATION-DITCHES.

1,210,271. Specification of Letters Patent. Patented Dec. 26, 1916.

Application filed July 25, 1916. Serial No. 111,318.

*To all whom it may concern:*

Be it known that I, JOHN W. BURGESS, a citizen of the United States, residing at Sault Ste. Marie, in the county of Chippewa and State of Michigan, have invented a new and useful Fish-Deflecting Means for the Outlets of Irrigation-Ditches, of which the following is a specification.

This invention has reference to fish deflecting means for the outlets of irrigation ditches and its object is to turn back fish which may reach such outlets and would otherwise pass through to the irrigated land and there become stranded and die.

In accordance with the present invention, which may be placed wherever needed, the water flowing through the irrigating ditch sets a paddle wheel in motion. In the path of the arms of the paddle wheel or parts carried thereby is a series of plates or blades normally above and out of contact with the stream and having a normal constraint to the inactive position, but yieldable to the arms of the paddle wheel to move rapidly into contact with the surface of the water, thereby producing a violent splash, as well as a shock or sound to which the fish are sensible. The arrangement is such that the blades strike the water in relatively rapid succession, wherefore the fish approaching the structure become frightened by the splash and noise or shock and quickly leave the neighborhood of the zone of agitation thereby produced. The arrangement is also such that all parts which would be liable to entangle or hold floating debris are at all times located so high above the surface of the water that such material cannot become lodged and choke the channel through which the water is directed to the fish frightening device.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings: Figure 1 is a longitudinal vertical section of a structure embodying the present invention. Fig. 2 is a plan view thereof with some parts in section. Fig. 3 is a cross-section on the line 3—3 of Fig. 1.

Referring to the drawings there is shown an open ended trough 1 which may be of a size to be lodged in an irrigating ditch near the discharge end thereof, the trough having side walls 2 and a bottom 3. Near that end of the trough into which the water flows the side walls carry supports 4 for journal boxes 5 in which are journaled the ends of a shaft 6 extending transversely of the trough. Mounted on the shaft is a series of arms 7 carrying paddles 8, there being an appropriate number of arms and paddles, so that with the arms in radial relation to the shaft one or more of the paddles engage with the flowing stream of water, indicated at 9 in Fig. 1. Furthermore, the shaft 6 is elevated at a sufficient distance above the surface of the stream to permit passage of all floating matter without engagement with the shaft or such engagement with the paddles as would cause the arrest of such floating matter and its lodgment on the paddle wheel made up of the paddles 8, arms 7 and shaft 6.

At another appropriate point in the trough 2 are cross beams 10 carrying brackets 11 at appropriate points and mounted on supports 12 at the ends, said supports being fast to the inner side walls of the trough. Each bracket 11 has a lever 13 connected thereto by a pivot pin 14 intermediate of the length of the lever and at one end of the lever there is secured a flat blade 15 elongated in the direction of the length of the lever, while the other end of the lever has a wear shoe 16 fast thereto. Each lever is constrained in one direction by a spring 17, the tension of which may be adjusted by nuts 18 or otherwise, and the spring is carried by a bar 19 fast to the beams 10. The action of the spring 17 is to hold the blade 15 above the surface of the stream in approximate parallel relation thereto, and the movement of the blade under the action of the spring is limited by a cross strip 20 against which the shoe end of the lever engages when the blade end of the lever is raised. The paddle wheel carries series of wear blocks 21 with the blocks of each series equal in number, in the particular showing of the drawings, to the number of arms 7 and blades 8. The blocks 21 are so positioned as to engage the wear shoes 16, thereby rocking the respective levers 13, of which three are shown in the drawings, on the pivots 14 and against the normal tendency of the springs 17.

The blades 15 and the parts carrying them are so located with relation to the surface of the stream 9 that the blades are, in their normal positions, sufficiently high above the stream to prevent any liability of floating debris finding lodgment thereagainst. At the same time the blades are in their normal position about parallel with the surface of the stream and sufficiently long so that when the blocks 21 engage the shoes 16 and thereby cause rocking movements of the levers 13 against the normal tendency of the springs, the blades strike the water with a resounding splash, thus so disturbing the water and causing such shocks to be imparted through the water as to frighten any fish in the neighborhood. The shocks follow each other with sufficient rapidity and the blades hit the water with sufficient force to maintain an agitation so pronounced that all fish approaching the outlet of the irrigating canal are frightened back and hence will not escape to the open land to there perish.

The structure of the present invention has the advantage of simplicity and economy of manufacture and does not require any special supporting means in the ditch or drain. There are no parts liable to cause arrest of debris and consequent damming of the ditch or canal with resultant erosion and damage. Because of the freedom from liability of obstruction the device requires no supervision, but will operate continuously for long periods of time without attention.

The movement of the water-striking blades upon the surface of the water is caused by the direct action of the water wheel thereon. By a suitable disposition of the blocks or lugs 21 the frequency of striking of the water with the blades may be made to vary in accordance with the location in which the device is installed. If the stream be sluggish, the number of blocks 21 may be increased, and if the stream be rapid they may be decreased, as circumstances may demand. The distance of the device above the surface of the stream may be always such as to avoid interference with passing debris, so that there is no liability of catching such debris and thereby clogging the stream.

What is claimed is:—

1. A fish deflector for irrigation ditches or canals, comprising actuating means responsive to the flow of water through the ditch or canal, and water impact means normally located above the surface of the water out of the path of debris floating on the water and normally constrained to remain in such location, said water impact means being in the path of the actuating means for movement by the latter into impact with the surface of the water flowing through the ditch or canal.

2. A fish deflector for irrigation ditches comprising a rotor responsive to flowing water in the ditch, and a series of blades having a normal constraint to remain out of the water and having means in the path of the rotor for impact by the latter to cause movements of the blade into contact with the surface of the water.

3. A fish deflector for irrigation canals or ditches, comprising a paddle wheel adapted to be rotated by water flowing through the ditch, and a series of blades in the path of the water wheel and arranged to be normally above the surface of the water, said blades being movable on engagement by the paddle wheel into impact with the surface of the water.

4. A fish deflector for irrigation ditches or canals, comprising a paddle wheel adapted to dip into and be rotated by flowing water in the ditch, and a series of blades associated with the paddle wheel for actuation by contact of the paddle wheel therewith, the blades having means constraining them to remain normally out of the water.

5. A fish deflector for irrigation ditches or canals, comprising a paddle wheel adapted to dip into and be rotated by a stream of water flowing through the ditch or canal, and a series of blades and pivotal supports therefor having a normal position above the surface of the flowing water, the supports having means for normally holding the blades above the water, and means in the path of the paddle wheel for actuating the supports and moving the blades against their normal tendency into contact with the surface of the flowing water.

6. A fish deflector for irrigation ditches or canals, comprising a paddle wheel, and a series of rock levers separate from the paddle wheel and each provided with a blade at one end, the paddle wheel and rock levers having coacting means for the actuation of the rock levers by rotative movements of the paddle wheel to cause impact of the blades with the surface of the water.

7. A fish deflector for irrigation ditches or canals, comprising a paddle wheel, and a series of rock levers each with a blade at one end, the paddle wheel and rock levers having coacting means for the actuation of the rock levers by rotative movements of the paddle wheel to cause impact of the blades with the surface of the water, each rock lever being provided with a spring for holding the blade end in a normal position above the surface of the water flowing through the ditch or canal.

In testimony that I claim the foregoing as my own, I have hereto affixed my signature in the presence of two witnesses.

JOHN W. BURGESS.

Witnesses:
ROBERTS P. HUDSON,
RUTH A. BRUBAKER.

Copies of this patent may be obtained for five cents each, by addressing the "Commissioner of Patents, Washington, D. C."